United States Patent
Yuk et al.

(10) Patent No.: US 10,996,824 B2
(45) Date of Patent: May 4, 2021

(54) DISPLAY DEVICE AND METHOD FOR CONTROLLING DISPLAY DEVICE

(71) Applicant: SAMSUNG ELECTRONICS CO., LTD., Suwon-si (KR)

(72) Inventors: Hyun-soo Yuk, Ansan-si (KR); Kyung-jin Kim, Seoul (KR); Sung-do Son, Yongin-si (KR); Mi-ra Yu, Seoul (KR); Jean Christophe Naour, Seoul (KR); Woo-seok Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/763,382

(22) PCT Filed: Aug. 10, 2018

(86) PCT No.: PCT/KR2018/009183
§ 371 (c)(1),
(2) Date: May 12, 2020

(87) PCT Pub. No.: WO2019/093624
PCT Pub. Date: May 16, 2019

(65) Prior Publication Data
US 2020/0401280 A1   Dec. 24, 2020

(30) Foreign Application Priority Data
Nov. 13, 2017   (KR) .......................... 10-2017-0150399

(51) Int. Cl.
*G06F 3/0482* (2013.01)
*G09G 3/20* (2006.01)
*G06F 3/14* (2006.01)

(52) U.S. Cl.
CPC .......... *G06F 3/0482* (2013.01); *G06F 3/1454* (2013.01); *G09G 3/20* (2013.01); *G09G 2354/00* (2013.01); *G09G 2370/06* (2013.01)

(58) Field of Classification Search
CPC .. G06F 3/0482; G06F 3/04817; G06F 3/0484; G06F 3/04842; G06F 3/04845;
(Continued)

(56) References Cited

U.S. PATENT DOCUMENTS 9,436,352 B2 * 9/2016 Eim ....................... G06F 3/0482
9,619,143 B2 * 4/2017 Herz ..................... G06F 3/0488
(Continued)

FOREIGN PATENT DOCUMENTS

JP   2013-047919 A   3/2013
KR   2002-0084148 A   11/2002
(Continued)

OTHER PUBLICATIONS

Form PCT/ISA/210; International Search Report dated Dec. 6, 2018 in International Patent Application No. PCT/KR2018/009183.

*Primary Examiner* — Tom V Sheng
(74) *Attorney, Agent, or Firm* — Staas & Halsey LLP

(57) ABSTRACT

The disclosure relates to a display apparatus including a display, a user input unit, a communicator, and a processor. The processor may display a plurality of first items representing content in a first area on the screen, list and display a plurality of second items selected based on a first user input among the plurality of displayed first items in a second area on the screen different from the first area, change and display a list order of two or more second items selected based on a second user input among the plurality of second items displayed in the second area, and transmit a request to an external apparatus to perform predetermined functions in
(Continued)

the list order of content corresponding to the plurality of second items changed in order in the second area.

15 Claims, 22 Drawing Sheets

(58) Field of Classification Search
CPC .... G06F 3/0486; G06F 3/1454; G06F 3/0416; G06F 2203/04803; G09G 3/20; G09G 2354/00; G09G 2370/06
USPC .......................................................... 345/156
See application file for complete search history.

(56) References Cited

U.S. PATENT DOCUMENTS

| | | | | |
|---|---|---|---|---|
| 2009/0007017 A1* | 1/2009 | Anzures | ................ | G06F 3/0483 715/835 |
| 2009/0183076 A1* | 7/2009 | Shim | .................... | G06F 3/0482 715/716 |
| 2010/0248788 A1* | 9/2010 | Yook | .................... | G06F 3/1415 455/566 |
| 2011/0072373 A1* | 3/2011 | Yuki | .................... | H04N 21/485 715/764 |
| 2011/0219333 A1* | 9/2011 | Park | ..................... | G06F 3/0482 715/808 |
| 2012/0066630 A1* | 3/2012 | Kim | ................... | G06F 3/04817 715/769 |
| 2012/0310807 A1* | 12/2012 | Calibey | ................ | G06F 3/0482 705/35 |
| 2013/0163023 A1* | 6/2013 | Tomono | ............. | H04N 1/00474 358/1.13 |
| 2013/0222321 A1* | 8/2013 | Buening | .................. | G09G 5/14 345/173 |
| 2013/0346912 A1* | 12/2013 | Buening | ............... | G06F 3/0482 715/783 |
| 2014/0068477 A1* | 3/2014 | Roh | .................... | G06F 3/04886 715/765 |
| 2014/0068478 A1* | 3/2014 | Won | .................... | G06F 3/04817 715/765 |
| 2014/0173516 A1* | 6/2014 | Hwang | ............... | G06F 3/04842 715/821 |
| 2014/0304631 A1* | 10/2014 | Wang | ................ | H04M 1/72563 715/765 |
| 2015/0205488 A1* | 7/2015 | Yi | ....................... | G06F 3/04842 715/769 |
| 2015/0370456 A1* | 12/2015 | Kobayashi | ............. | A63F 13/23 463/33 |
| 2016/0378967 A1* | 12/2016 | Li | ....................... | G06F 3/04817 726/19 |
| 2017/0192631 A1* | 7/2017 | Lee | ....................... | G06F 3/0484 |
| 2018/0108076 A1* | 4/2018 | Tu | ...................... | G06Q 30/0641 |

FOREIGN PATENT DOCUMENTS

| | | |
|---|---|---|
| KR | 10-2012-0028582 A | 3/2012 |
| KR | 10-2012-0065675 A | 6/2012 |
| KR | 10-2012-0117219 A | 10/2012 |
| KR | 10-1352713 B1 | 1/2014 |
| KR | 2015-0033308 A | 4/2015 |

* cited by examiner

DISPLAY DEVICE AND METHOD FOR CONTROLLING DISPLAY DEVICE

CROSS-REFERENCE TO RELATED APPLICATIONS

This application is a U.S. National Stage Application which claims the benefit under 35 U.S.C. § 371 of International Patent Application No. PCT/KR2018/009183 filed on Aug. 10, 2018, which claims foreign priority benefit under 35 U.S.C. § 119 of Korean Patent Application No. 10-2017-0150399 filed on Nov. 13, 2017, in the Korean Intellectual Property Office, the contents of both of which are incorporated herein by reference.

TECHNICAL FIELD

The disclosure relates to a display apparatus and a method of controlling the display apparatus.

BACKGROUND ART

A smart apparatus such as a smartphone, a smart television (TV), a wearable apparatus, a tablet computer, a personal computer (PC), etc. has a content edit function. The content edit function refers to a function by which a user is allowed to select some pieces of content among a lot of pieces of content and edit the selected content and edit the selected pieces of content.

Because the section of the content and the edit of the selected content are not carried out on one screen, there is a need of depth or screen change/movement between the section of the content and the edit of the content. However, frequent change/movement between the selection of the content and the edit of the content may cause work efficiency to be lowered.

Technical Problem

Accordingly, an aspect of the disclosure is to provide a display apparatus and a method of controlling the display apparatus, in which selection and edit of content are carried out on one screen to thereby improve work efficiency.

Technical Solution

According to an embodiment of the disclosure, there is provided a display apparatus including: a display configured to display a screen; a user input unit configured to receive a user input; a communicator configured to communicate with an external apparatus; and a processor configured to display a plurality of first items representing pieces of content in a first area on the screen, list and display a plurality of second items selected based on a first user input among the plurality of displayed first items in a second area on the screen different from the first area, change and display a list order of two or more second items selected based on a second user input among the plurality of second items displayed in the second area, and transmit a request to the external apparatus to perform predetermined functions according to the list order with respect to pieces of content corresponding to the plurality of second items changed in order in the second area.

Here, the processor may add the second item, which is selected based on the first user input among the plurality of first items displayed in the first area, between the plurality of second items displayed in the second area.

Here, the processor may move or delete the second item selected based on the second user input among the plurality of second items displayed in the second area.

Here, the processor may display the second item, which is selected based on the second user input among the plurality of second items displayed in the second area, to be distinguished from other second items.

Here, the processor may extend and display the second area based on a third user input to the second area.

Here, the processor may display content of the second item selected based on the second user input among the plurality of second items displayed in the second area.

Here, the processor may display the first item, which represents content corresponding to content of the second item selected based on the first user input among the plurality of first items displayed in the first area, in the first area.

Here, the processor may display the second item, which represents content corresponding to content of the second item selected based on the first user input among the plurality of first items displayed in the first area, to be distinguished from other second items among the plurality of second items displayed in the second area.

According to an embodiment of the disclosure, there is provided a method of controlling a display apparatus including a display configured to display a screen, a user input unit configured to receive a user input, and a communicator configured to communicate with an external apparatus, the method including: displaying a plurality of first items representing pieces of content in a first area on the screen; listing and displaying a plurality of second items selected based on a first user input among the plurality of displayed first items in a second area on the screen different from the first area; changing and displaying a list order of two or more second items selected based on a second user input among the plurality of second items displayed in the second area; and transmitting a request to the external apparatus to perform predetermined functions according to the list order with respect to pieces of content corresponding to the plurality of second items changed in order in the second area.

Here, the changing and displaying the list order may include adding the second item, which is selected based on the first user input among the plurality of first items displayed in the first area, between the plurality of second items displayed in the second area.

Here, the changing and displaying the list order may include moving or deleting the second item selected based on the second user input among the plurality of second items displayed in the second area.

Here, the changing and displaying the list order may include displaying the second item, which is selected based on the second user input among the plurality of second items displayed in the second area, to be distinguished from other second items.

Here, the method may further include extending and displaying the second area based on a third user input to the second area.

Here, the method may further include displaying content of the second item selected based on the second user input among the plurality of second items displayed in the second area.

Here, the method may further include displaying the first item, which represents content corresponding to content of the second item selected based on the first user input among the plurality of first items displayed in the first area, in the first area.

Here, the method may further include displaying the second item, which represents content corresponding to content of the second item selected based on the first user input among the plurality of first items displayed in the first area, to be distinguished from other second items among the plurality of second items displayed in the second area.

According to an embodiment of the disclosure, there is provided a recording medium stored with a computer program including a computer readable code, i.e. a code for performing a method of controlling a display apparatus including a display configured to display a screen, a user input unit configured to receive a user input, and a communicator configured to communicate with an external apparatus, the method including: displaying a plurality of first items representing pieces of content in a first area on the screen; listing and displaying a plurality of second items selected based on a first user input among the plurality of displayed first items in a second area on the screen different from the first area; changing and displaying a list order of two or more second items selected based on a second user input among the plurality of second items displayed in the second area; and transmitting a request to the external apparatus to perform predetermined functions according to the list order with respect to pieces of content corresponding to the plurality of second items changed in order in the second area.

Advantageous Effects

Therefore, according to the disclosure, there are provided a display apparatus and a method of controlling the display apparatus, in which selection and edit of content are carried out on one screen to thereby improve work efficiency.

BEST MODE

Figure 1:
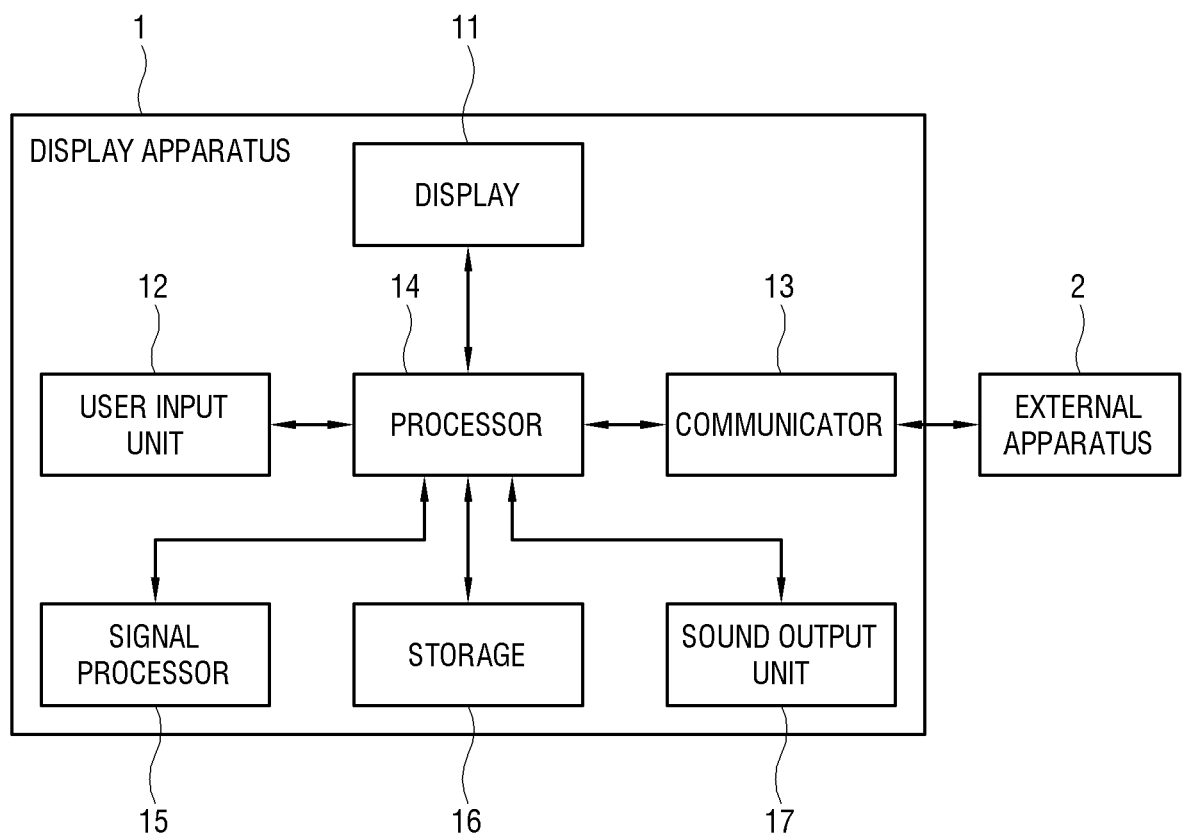
FIG. 1 is a block diagram of a display apparatus according to an embodiment of the disclosure.

Below, embodiments of the disclosure will be described in detail with reference to accompanying drawings. In the description of the following embodiments, elements illustrated in the accompanying drawings will be referenced, and like numerals or symbols set forth in the drawings refer to like elements having substantially the same functions.

FIG. 1 is a block diagram of a display apparatus 1 according to an embodiment of the disclosure. The display apparatus 1 shown in FIG. 1 may be embodied by a smart apparatus such as a smartphone, a smart television (TV), a wearable apparatus, a tablet computer, a personal computer (PC), etc. The display apparatus 1 may include a display 11, a user input unit 12, a communicator 13, and a processor 14. However, at least one among these elements may be excluded from the display apparatus 1, or another element may be added to the display apparatus 1.

The display 11 may display content on a screen based on a processed content signal. The display 11 may display a text, a symbol, a figure, a menu, an item, a thumbnail image, an electronic program guide (EPG), etc. corresponding to the content on a screen. The display 11 may be embodied by various types such as a liquid crystal display (LCD), a light emitting diode (LED), an organic light emitting diode (OLED), and the like capable of displaying a content image.

The user input unit 12 may receive various user inputs in connection with operations of the display apparatus 1.

The user input unit 12 may receive a user's input in connection with content displayed on the display 11. The user input unit 12 may be embodied by a touch screen provided in the display 11 and receiving a user's touch input. The communicator 13 communicates with and exchanges a content signal with an external apparatus 2 capable of displaying a content image. There are no limits to a communication mode of the communicator 13.

The processor 14 may control general elements of the display apparatus 1. The processor 14 may include a control program (or instruction) for performing control with regard to general elements of the display apparatus 1, a nonvolatile memory in which the control program is installed, a volatile memory in which at least a part of the installed control program is loaded, and at least one processor or central processing unit (CPU) for executing a loaded control program. Further, such a control program may be stored in an electronic apparatus other than the display apparatus 1.

The control program may include a program(s) actualized in the form of at least one among a basis input/output system (BIOS), a device driver, an operating system, a firmware, a platform, and an application. According to an exemplary embodiment, the application may be previously installed or stored when the display apparatus 1 is manufactured, or may be installed based on application data received from the outside when it is used in the future. The application data may for example be downloaded from an application market and the like external server. Such an external server is an example of a computer program product, but not limited to this example.

Further, the display apparatus 1 may further include a signal processor 15, a storage 16, a sound output unit 17, etc. The signal processor 15 may perform various processes with regard to a content signal, and process content to be executed. The signal processor 15 may include a hardware processor achieved by a chipset, a circuit, a buffer, etc. mounted onto a printed circuit board, or may also be designed as a system on chip (SOC). The storage 16 refers to a nonvolatile memory such as a flash memory, a hard disk drive, etc., which may be configured to store a content signal, data related to content, a program for executing content, and information about an application. The sound output unit 17 may output a content sound based on a content signal processed by the signal processor 15 to the outside.

Figure 2:
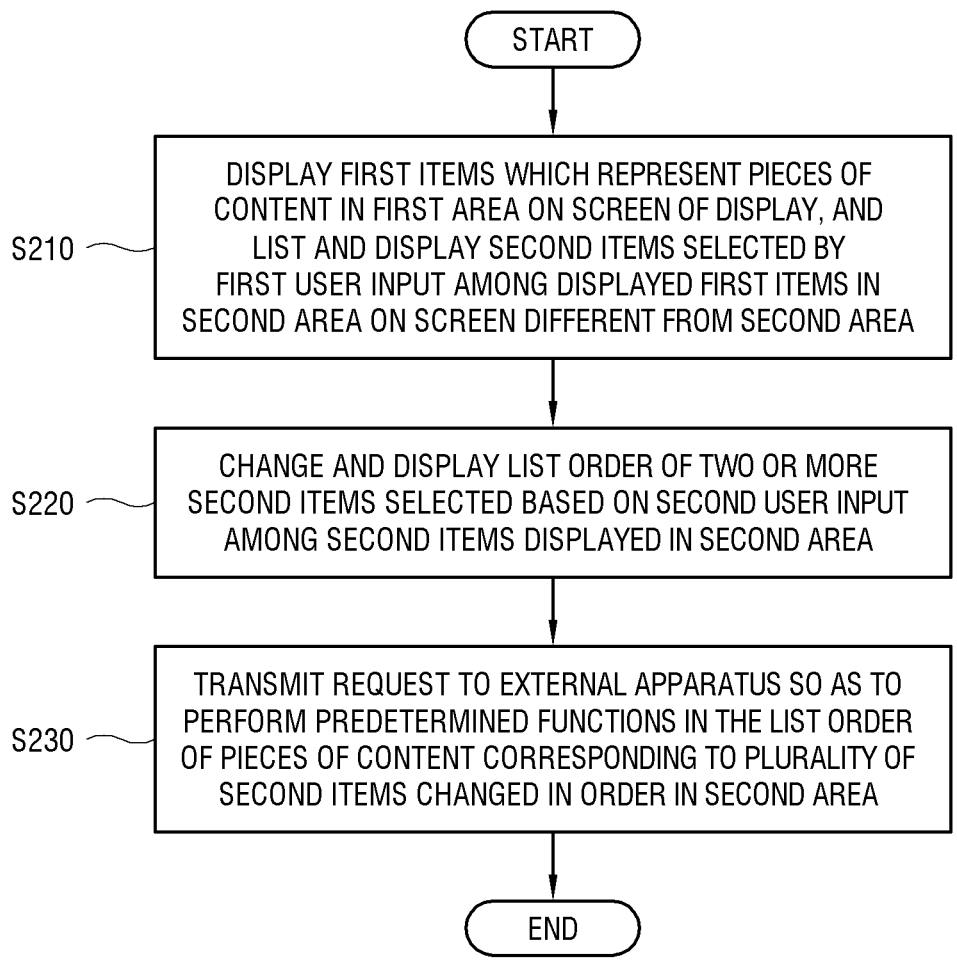
FIG. 2 is a flowchart showing a method of controlling the display apparatus of FIG. 1.

FIG. 2 is a flowchart showing a method of controlling the display apparatus of FIG. 1. As shown in FIG. 2, the display apparatus 1 of FIG. 1 may display a plurality of first items which represent pieces of content in a first area on the screen of the display 11, and list and display a plurality of second items selected by a first user input among the plurality of displayed first items in a second area on the screen different from the second area (S210).

The display apparatus 1 may change and display a list order of two or more second items selected based on a second user input among the plurality of second items displayed in the second area (S220). Further, the display apparatus 1 may transmit a request to the external apparatus so that predetermined functions can be performed according to the list order with respect to pieces of content corresponding to the plurality of second items, order of which was changed in the second area (S230).

Thus, it is easy for a user to select a plurality of second items among the plurality of first items through one screen, and change the list order of the plurality of selected second items. In other words, selection and edit of the plurality of first items, which represent pieces of content, are carried out on one screen, thereby improving work efficiency.

Figure 3:
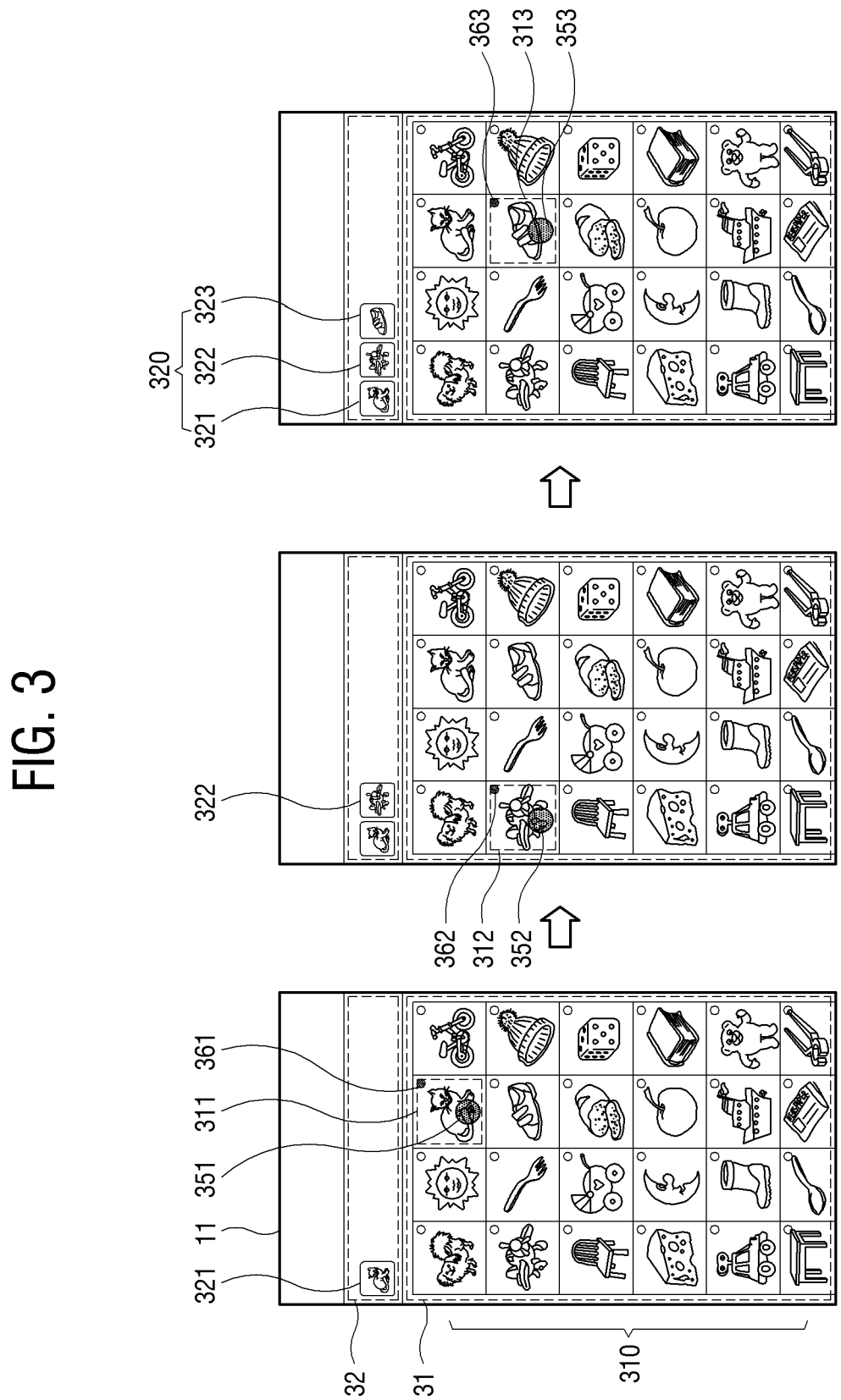
FIG. 3 illustrates an example that the display apparatus of FIG. 1 adds a second item to a second area.

FIG. 3 illustrates an example that the display apparatus of FIG. 1 adds a second item to a second area. The display apparatus 1 may receive a user input for retrieving, selecting and editing content through the user input unit 12, and execute a program, an application, a browser, a user interface (UI), etc. for functions of retrieving, selecting and editing the content.

As shown in FIG. 1, when the program, the application, the browser, the UI, etc. for the functions of retrieving, selecting and editing the content are executed, the processor 14 may list and display a plurality of first items 310, which represent the content, in a first area 31 on the screen of the display 11. When a first user input 351 for selecting a first item 311 among the plurality of first items 310 displayed in the first area 31 is received, the processor 14 displays a second item 321 corresponding to the first item 311 in a second area 32. The second item 321 may represent the same content as the first item 311.

The content, which is related to a text, a symbol, a sound, a picture, an image, etc., may have been stored in the storage 16 or received from the outside. The first items 310 and the second items 320 may include a text, a symbol, a cover, an album jacket, a picture, a still-cut photograph, a thumbnail, an EPG, and the like that represents the content. The first area 31 and the second area 32 may refer to any area on the screen. The second item 321 in the second area 32 may be different in size, resolution, brightness, etc. from the first item 311 in the first area 31.

In the same manner, the processor 14 may display second items 322 and 323, which correspond to first items 312 and 313 selected by first user inputs 352 and 353 among the plurality of first items 310 displayed in the first area 31, in the second area 32. Here, as shown in FIG. 3, the plurality of second items 321, 322 and 323 displayed in the second area 32 may be sequentially displayed in order of the first user inputs. In this case, certain portions within the first items 311, 312 and 313 selected by the first user inputs 351, 352 and 353 may be marked with selection checks or section sequences 361, 362 and 363 corresponding to the first user inputs 351, 352 and 353.

However, the plurality of second items 321, 322 and 323 may be listed in different order in the second area 32. For example, the list order of the second items 320 may be displayed in the second area 32 as varied depending on a stored date, a received date, a taken date, a data size, a type, a kind, a theme, a category, a selection frequency, a user's preference, a play time, etc. of the content represented by the first items 310. Such order may be arbitrarily changed in response to a user input.

Further, when the number of first items 310 is greater than or equal to a predetermined quantity displayable in the current first area 31, a user may select first items among the plurality of first items 310 while scrolling up/down or left/right the first area 31. Further, even the first item selected in the scrolled first area 31 may also be displayed as the second item in the second area 32.

Like this, a user can easily check that the first items 311, 312 and 313 are selected in the first area 31, through the second item 321, 322 and 323 displayed in the second area 32. In other words, the second items 321, 322 and 323 displayed in the second area 32 may function as a preview of the first user inputs 351, 352 and 353.

Figure 4:
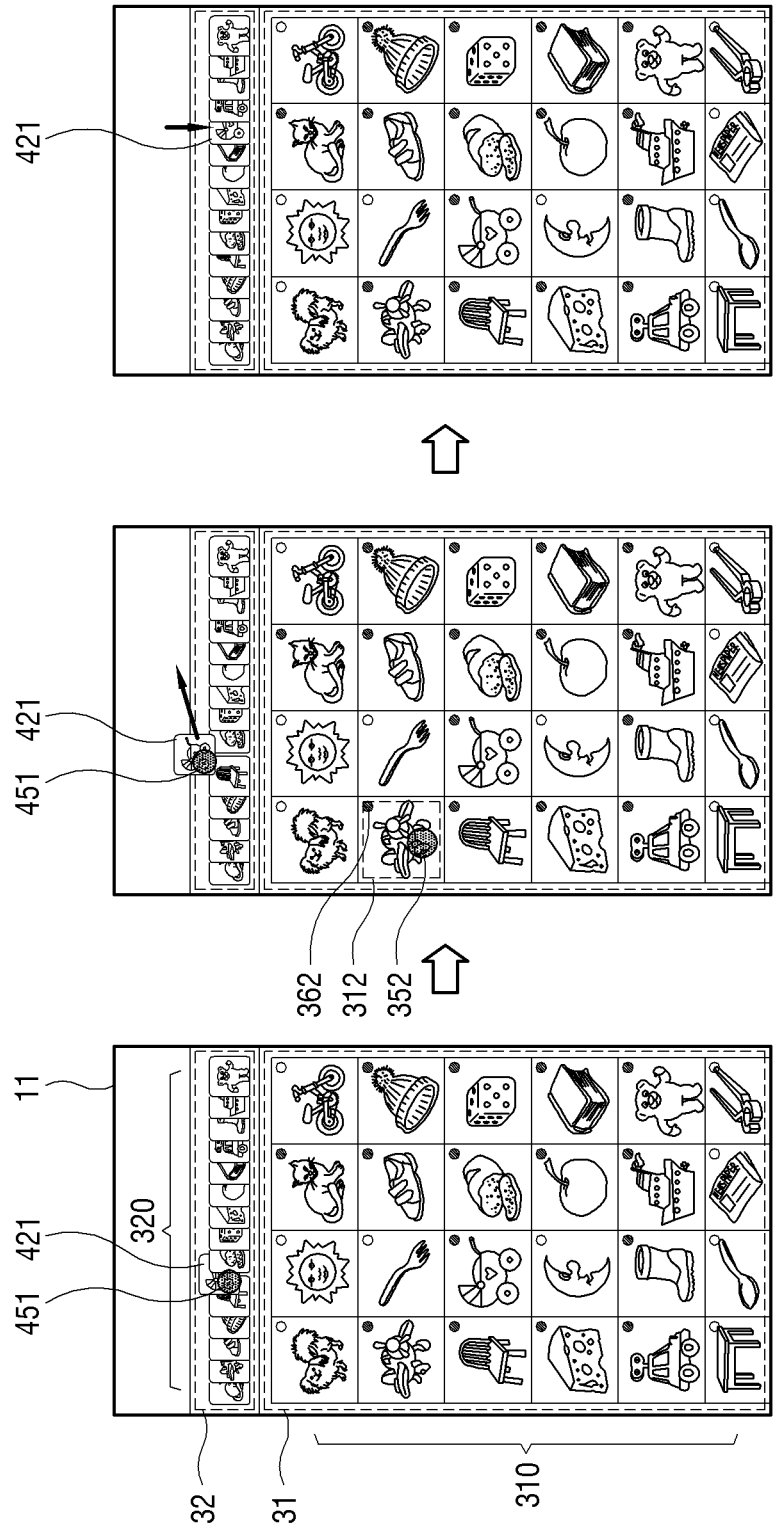
FIG. 4 illustrates an example that the display apparatus of FIG. 3 changes a list order of second items in a second area.

FIG. 4 illustrates an example that the display apparatus of FIG. 3 changes a list order of second items in a second area. As shown in FIG. 4, the display apparatus 1 may change the list order of selected second items among a plurality of second items 320, which are displayed in the second area 32 by the first user input, in response to a second user input, and display the selected second items in the changed list order.

For example, the display apparatus 1 may receive a second user input 451 that selects a second item 421 among the plurality of second items 320 displayed in a predetermined list order. By dragging and dropping the second item 421 to be put between other second items based on the second user input 451, the plurality of second items 320 are rearranged to thereby change the list order of the plurality of second items 320. The second user input 451 may include a touch for more than a predetermined period of time, dragging, and dropping with respect to the second item 421.

The second item 421 may be activated/inactivated by the second user input 451. When the second item 421 is activated, the second item 421 may be displayed to be distinguished from other unselected second items. For example, the second item 421 may be displayed to be different in size, brightness, shape, etc. When the plurality of second items 320 are just partially displayed as overlapped with each other, the activated second item 421 may be fully displayed.

On the other hand, when the second item 421 is inactivated, the second item 421 is displayed like other second items. For example, the inactivated second item 421 may be displayed to have the size, the brightness, the shape, etc. corresponding to those of other second items, and just partially displayed as overlapped with other second items.

Thus, it is easy for a user to check the plurality of second items 320 selected from the plurality of first items displayed in the first area 31, and change the list order of the plurality of second items 320. In other words, the selection of the plurality of second items 320 and the change in the list order of the plurality of selected second items 320 are possible on one screen without depth or without screen change/movement, and thus the work efficiency is improved.

Figure 5:
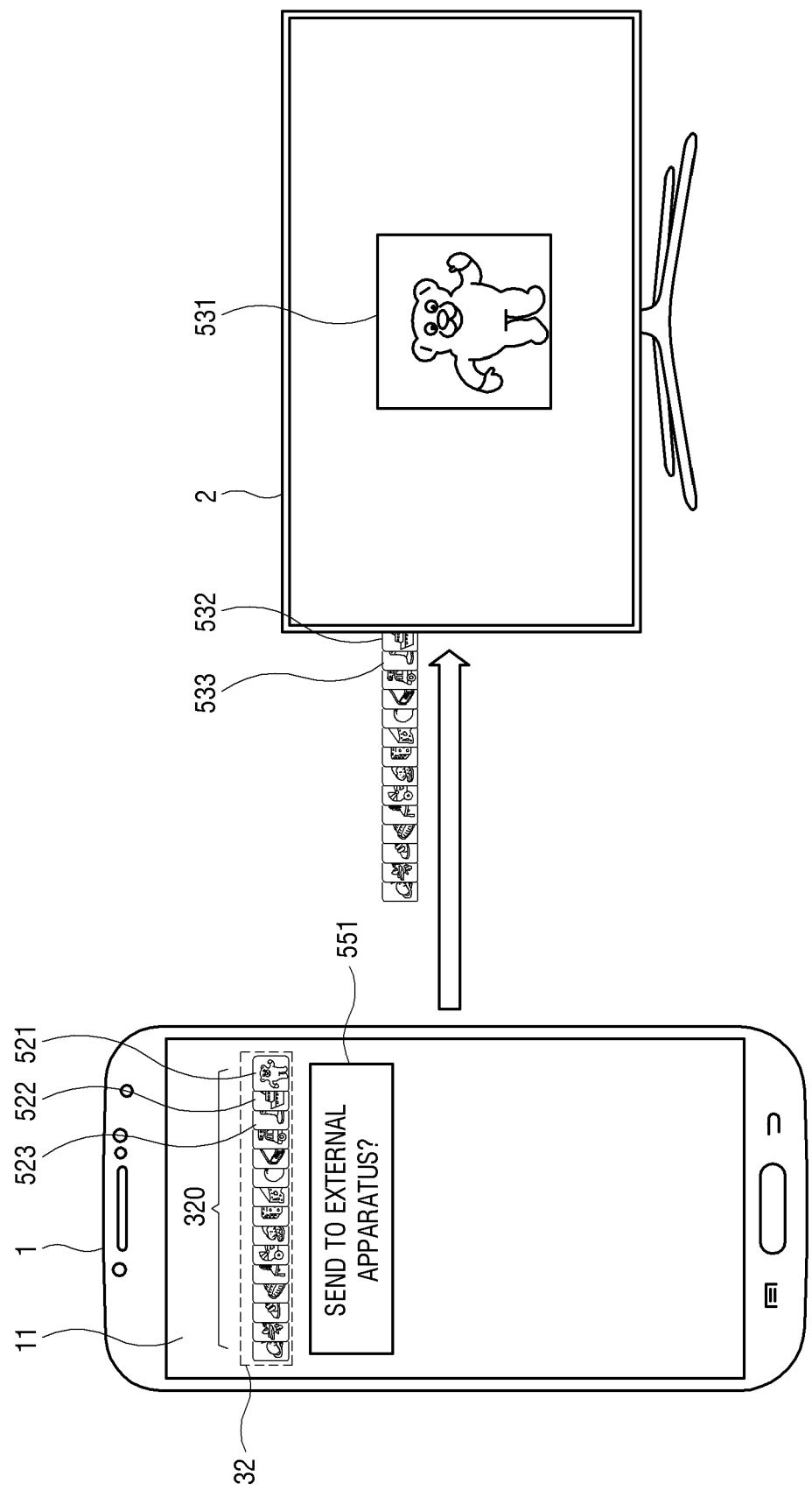
FIG. 5 illustrates an example that the display apparatus of FIG. 3 communicates with an external apparatus.

FIG. 5 illustrates an example that the display apparatus of FIG. 3 communicates with an external apparatus. As shown in FIG. 5, the display apparatus 1 may transmit the plurality of second items 320 listed in predetermined order to the external apparatus 2, and the external apparatus 2 may sequentially display pieces of content corresponding to the plurality of second items 320 in the predetermined order. The display apparatus 1 may receive a user input, which is made to transmit the plurality of second items 320 listed in predetermined order to the external apparatus 2, through the user input unit 12. As necessary, a UI 551 may be displayed to guide a user input.

In response to the user input, the display apparatus 1 may transmit content of a plurality of second items 521, 522 and 523 listed in predetermined order to the external apparatus 2 through the communicator 13. The external apparatus 2 may sequentially display pieces of content 531, 532 and 533 of the second items 521, 522 and 523 in the predetermined order. Here, the external apparatus 2 may include a display or an output unit to display or output the content.

For example, when the external apparatus 2 includes a large format display, the large format display may not be suitable for retrieving, selecting, and editing content. In this case, the display apparatus 1 suitable for retrieving, selecting, and editing the content may be used to select the plurality of second items 521, 522 and 523 among the plurality of first items corresponding to the content, and edit the plurality of second items 521, 522 and 523 to be listed in the predetermined order.

In particular, the display apparatus 1 is convenient to retrieve, select and edit the content because the plurality of selected second items 521, 522 and 523 and the plurality of second items 521, 522 and 523 edited to have the predetermined list order are checkable through one screen. Further, the display apparatus 1 may transmit the plurality of second items 521, 522 and 523 listed in predetermined order to the external apparatus 2.

Further, the display apparatus 1 may store information about the predetermined list order of the second items 521, 522 and 523 in the storage 16. Then, when the same operation is repeated, the information about the predetermined list order stored in the storage 16 may be referenced.

Figure 6:
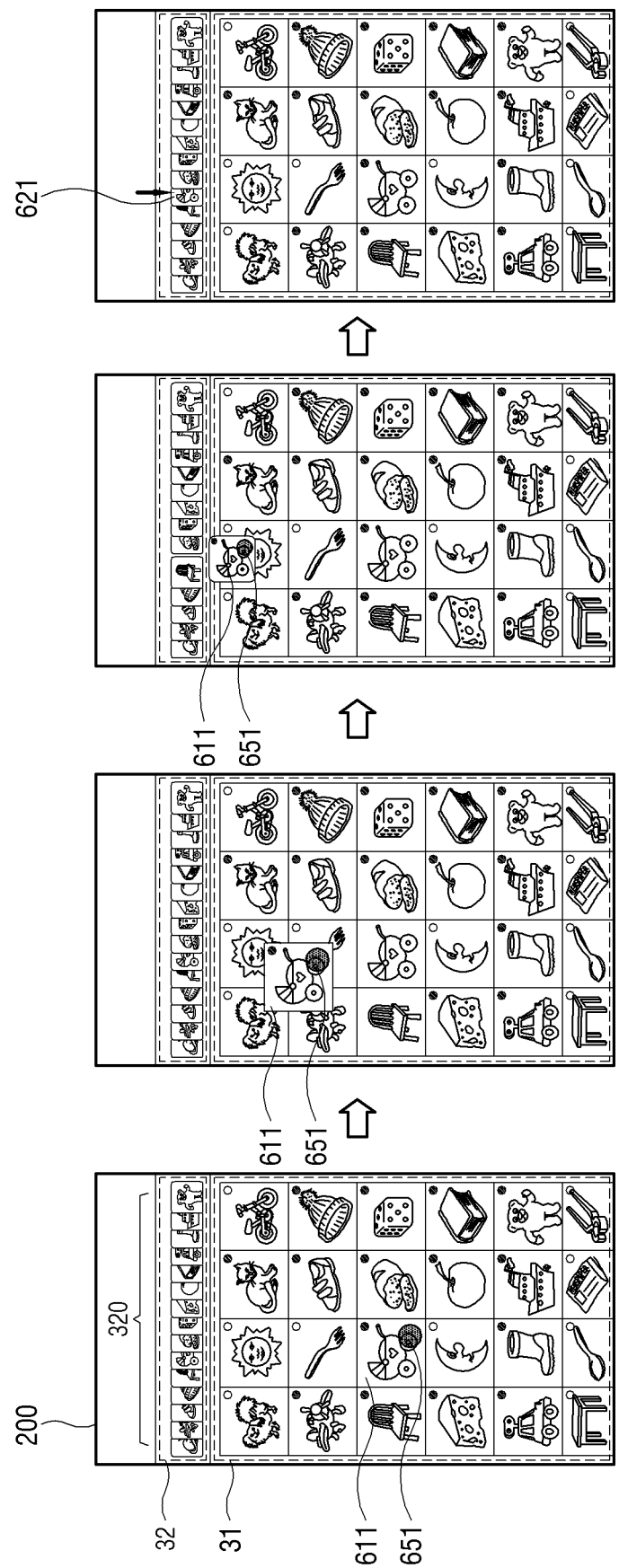
FIG. 6 illustrates an example that the display apparatus of FIG. 3 adds the second item to the second area.

FIG. 6 illustrates an example that the display apparatus of FIG. 3 adds the second item to the second area. As described above with reference to FIG. 3, the display apparatus 1 may display the plurality of first items 310 in the first area 31, and display the plurality of second items 320 in the second area 32.

As shown in FIG. 6, a first item 611 selected by a user input 651 among the plurality of first items 310 displayed in the first area 31 may be dragged to be put between the second items displayed in the second area 32. When the first item 611 is dragged and dropped between the plurality of second items 320, a dropped second item 621 causes the plurality of second items 320 to be rearranged, thereby changing the list order of the plurality of second items 320.

The first item 611 may be activated in response to the user input 651. When the first item 611 is activated, the first item 611 may be displayed to be distinguished from other unselected first items. For example, the first item 611 may be displayed to be different in size, brightness, shape, etc. On the other hand, a second item 621 may be inactivated by the user input 651. The inactivated second item 621 may be displayed corresponding to other second items. For example, the second item 621 may be displayed to be different in size, brightness, shape, etc. corresponding to those of other second items.

Thus, it is easy for a user to check the plurality of second items 320 selected from the plurality of first items displayed in the first area 31, and change the list order of the plurality of second items 320. In other words, the selection of the plurality of second items 320 and the change in the list order of the plurality of selected second items 320 are possible on one screen without depth or without screen change/movement, and thus the work efficiency is improved.

Figure 7:
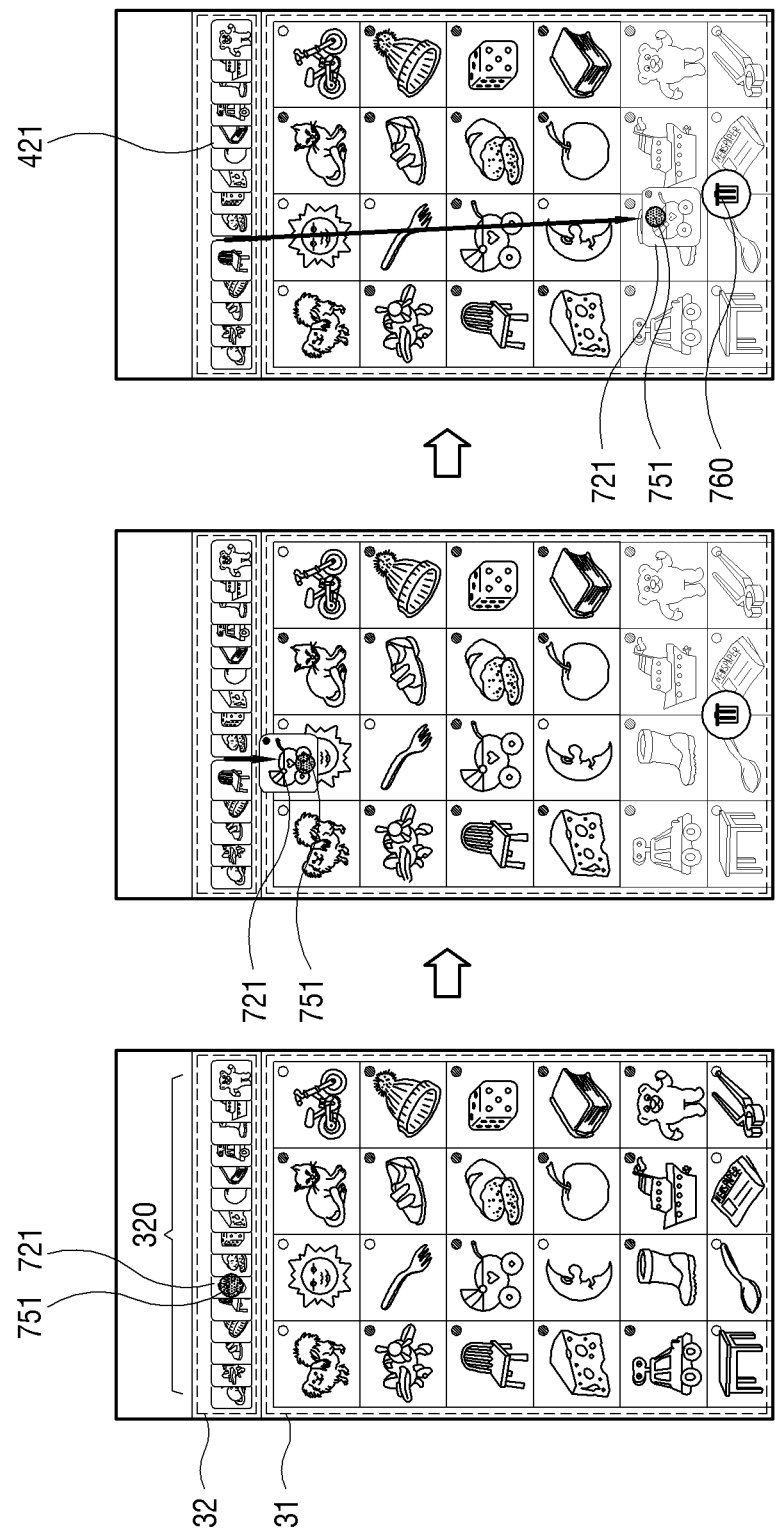
FIG. 7 illustrates an example that the display apparatus of FIG. 3 removes the second item from the second area.

FIG. 7 illustrates an example that the display apparatus of FIG. 3 removes the second item from the second area. As described above with reference to FIG. 3, the display apparatus 1 may display the plurality of first items 310 in the first area 31, and display the plurality of second items 320 in the second area 32.

As shown in FIG. 7, a second item 721 selected by a user input 751 among the plurality of second items 320 displayed in the second area 32 may be removed from the second items displayed in the second area 32. When the second item 721 is activated by the user input 751 and dragged out of the second area 32, the removed second item 721 causes the plurality of second items 320 to be rearranged, thereby changing the list order of the plurality of second items 320.

As necessary, when the second item 721 is dragged out of the second area 32, an icon shaped like a trash can may be displayed. When the second item 721 is dragged up to the trash-can icon, the second item 721 may be removed from the plurality of second items 320.

Thus, it is easy for a user to remove the second item 721 from the plurality of second items 320 displayed in the second area 32. In other words, it is possible to select the plurality of second items 320 and remove the second item 721 from the plurality of second items 320 through one screen without depth or without screen change/movement, and thus the work efficiency is improved.

Figure 8:
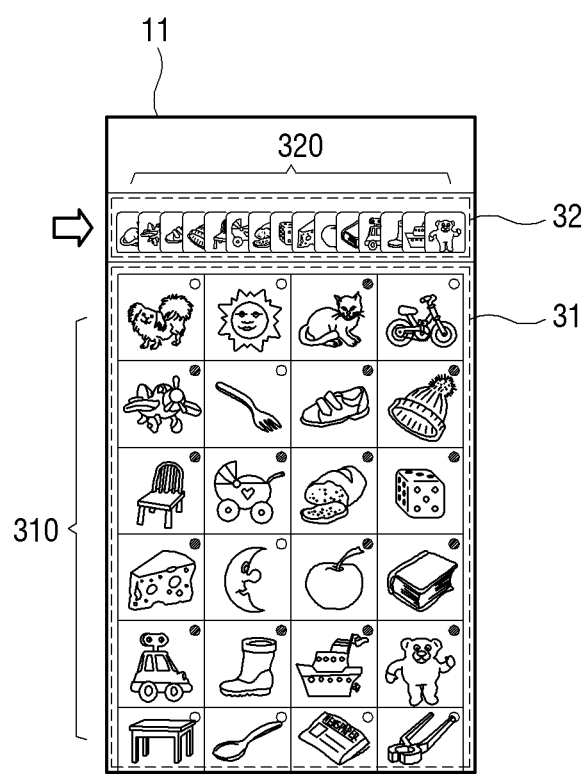
FIG. 8 illustrates an example that relates to a position of the second area.
Figure 9:
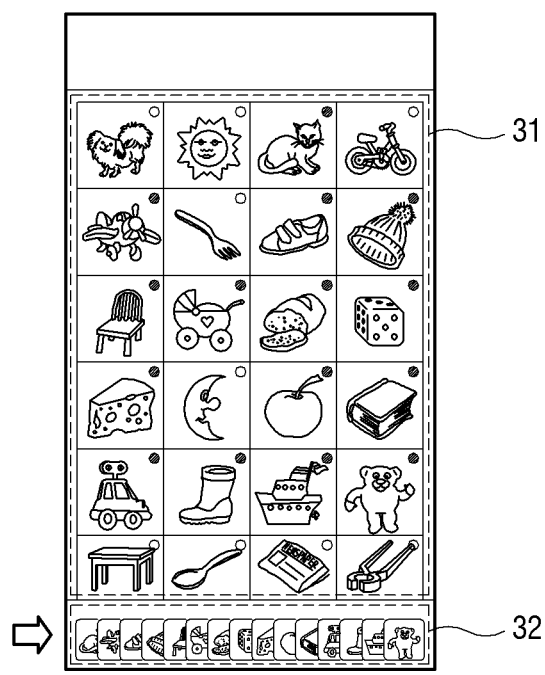
FIG. 9 illustrates another example that relates to a position of the second area.

FIGS. 8 and 9 illustrate examples that relate to a position of the second area. As described above with reference to FIG. 3, the display apparatus 1 may display the plurality of first items 310 in the first area 31, and display the plurality of second items 320 in the second area 32.

As shown in FIG. 8, the second area 32 may be positioned at an upper portion of the first area 31. Further, in response to a user input made to change the position of the second area 32, as shown in FIG. 9, the second area 32 may be positioned at a lower portion of the first area 31. However, the position of the second area 32 with respect to the first area 31 may be changed based on the motions, states, use conditions, etc. of the display apparatus 1. The second area 32 may be positioned at a left/right portion of the first area 31.

Figure 10:
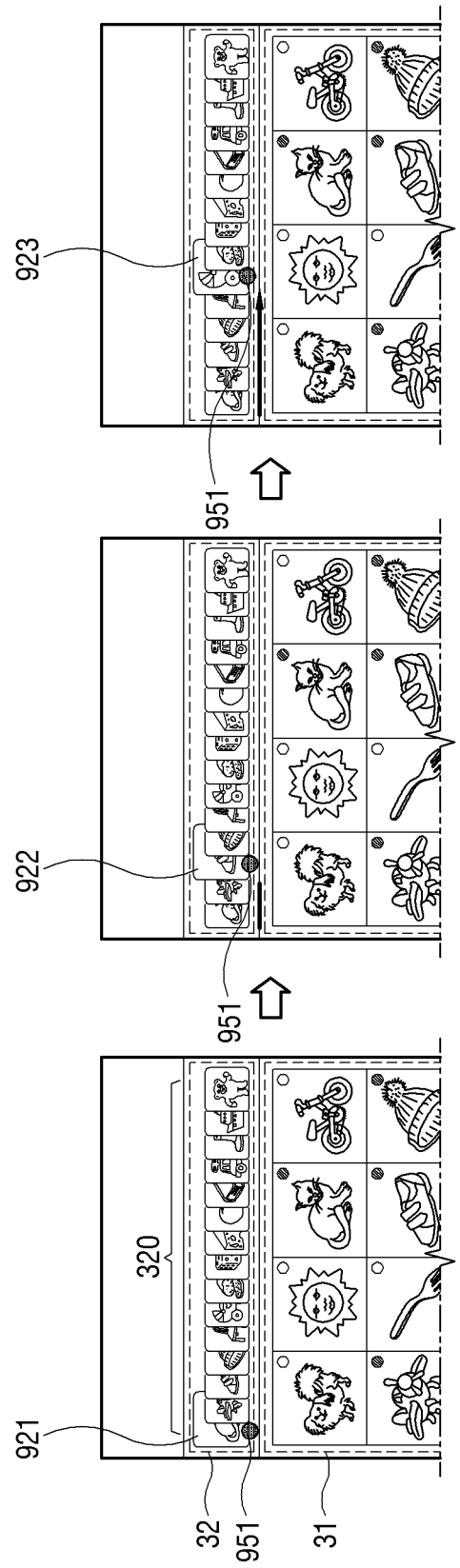
FIG. 10 illustrates an example that the display apparatus of FIG. 3 searches a second item in the second area.

FIG. 10 illustrates an example that the display apparatus of FIG. 3 searches a second item in the second area. As shown in FIG. 10, the display apparatus 1 may retrieve the second items 921, 922 and 923 selected by a user input 951 from the plurality of second items 320 displayed in the second area 32.

Specifically, the display apparatus 1 may receive the user input 951 made to select the second item 921 among the plurality of second items 320 displayed in predetermined list order. The second item 921 may be activated by the user input 951, and the second item 921 may be displayed to be different in size, brightness, shape, etc. to be distinguished from other unselected second items. When the plurality of second items 320 are just partially displayed as overlapped with each other, the activated second item 921 may be fully displayed.

A user may move the user input 951 to the neighboring second items 922 and 923 in sequence, while maintaining a touch. Then, the second item 921 becomes inactivated, and the neighboring second items 922 and 923 are sequentially activated. When the second item 921 is inactivated, the second item 921 may be displayed as returned to the state of before the activation.

Thus, it is easy for a user to search for the second items 921, 922 and 923 activated by the user input 951 among the plurality of second items 320. In other words, it is possible to select the plurality of second items 320 and searches the plurality of selected second items 320 on one screen without depth or without screen change/movement, and thus the work efficiency is improved.

Figure 11:
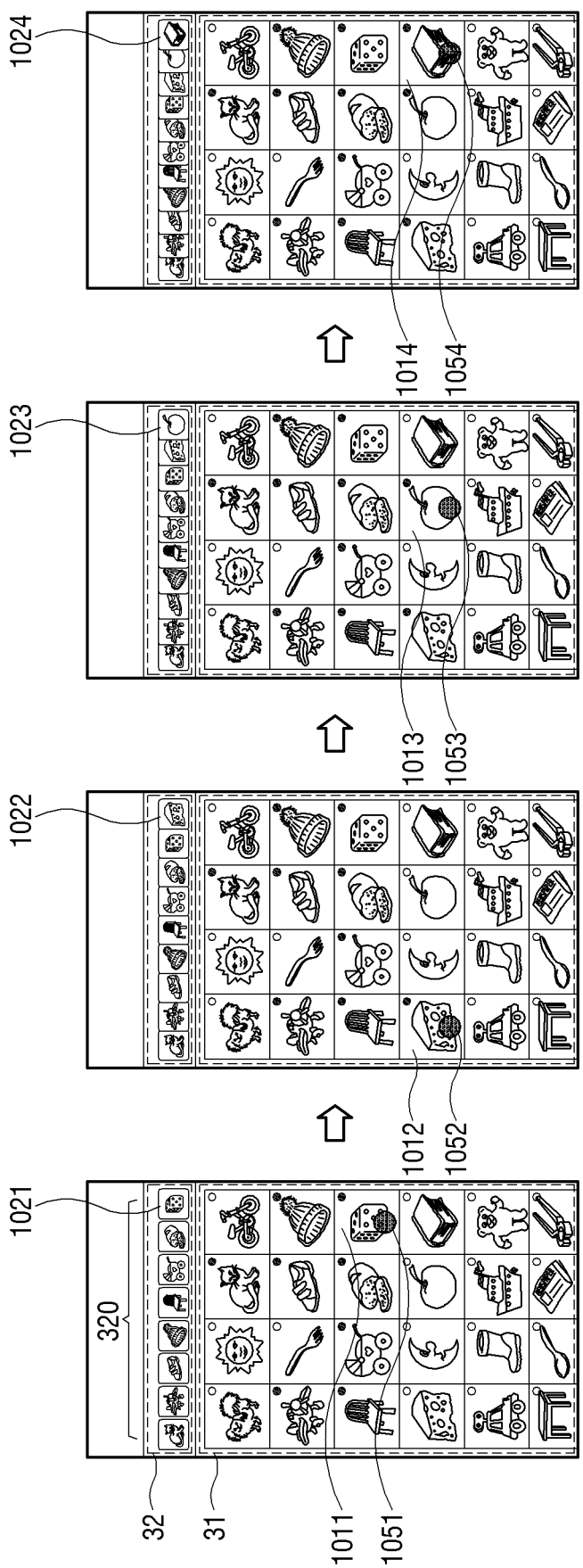
FIG. 11 illustrates an example that the display apparatus of FIG. 3 adds the second item to the second area.

FIG. 11 illustrates an example that the display apparatus of FIG. 3 adds the second item to the second area. As shown in FIG. 11, when a first user input 1051 made to select a first item 1011 among the plurality of first items 310 displayed in the first area 31 is received, the display apparatus 1 displays a second item 1021 corresponding to the first item 1011 in the second area 32. Here, when the second item 1021 added to the second area 32 by the first user input 1051 causes the number of second items 320 displayed in the second area 32 to be greater than or equal to a predetermined quantity, the display apparatus 1 may reduce the size of the plurality of second items 320 or display only parts of the second items 320 as the plurality of second items 320 are overlapped with each other.

When the first items 1012, 1013 and 1014 are selected in sequence by the first user inputs 1052, 1053 and 1054, second items 1022, 1023 and 1024 corresponding to the first items 1012, 1013 and 1014 may be sequentially added to and displayed in the second area 32. Likewise, as the second items 1022, 1023 and 1024 are sequentially added to the second area 32, the display apparatus 1 may display the plurality of second items 320 as gradually decreased in size or more overlapped with each other. On the other hand, when the second items 1022, 1023 and 1024 are sequentially removed from the plurality of second items 320 displayed in the second area 32, the display apparatus 1 may display the plurality of second items 320 as gradually increased in size or less overlapped with each other.

Figure 12:
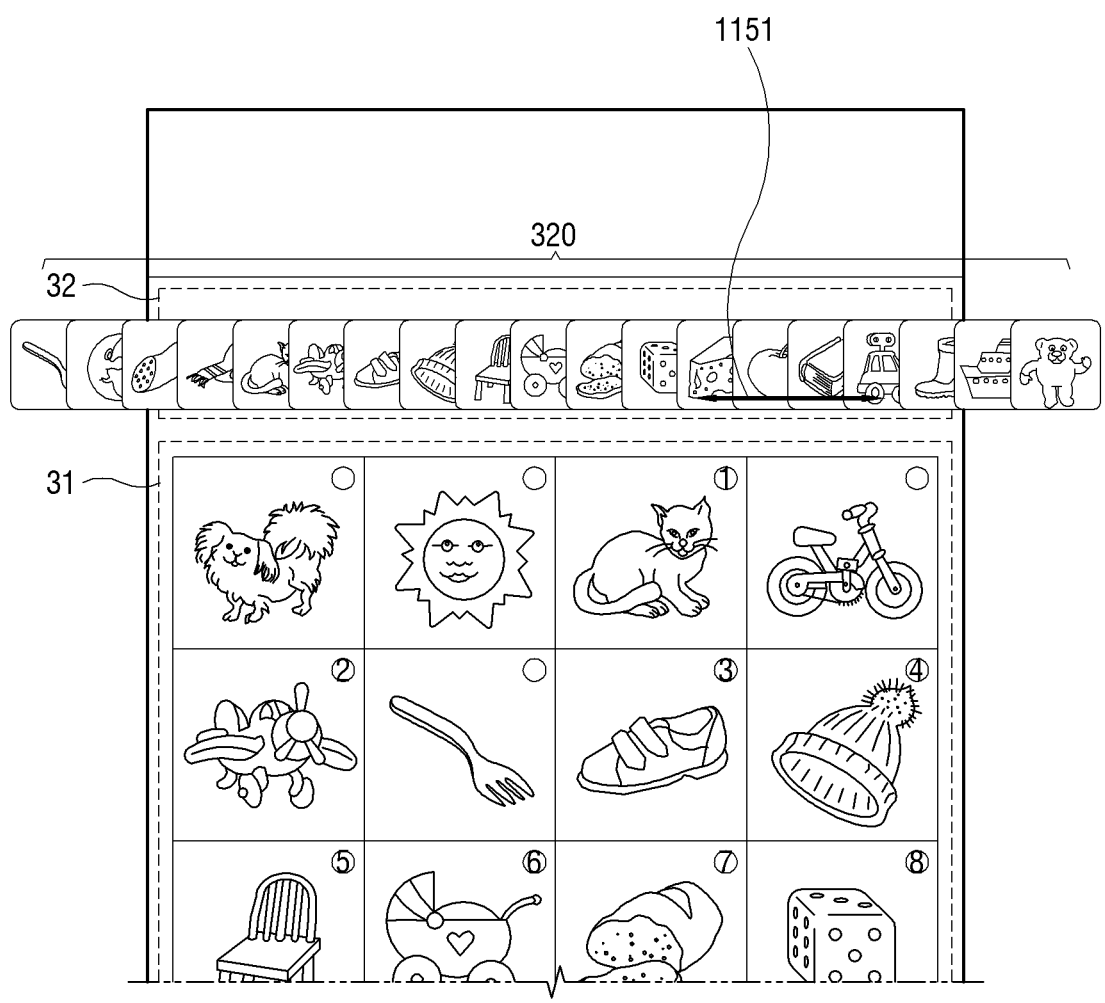
FIG. 12 illustrates an example that the display apparatus of FIG. 3 scrolls the second item in the second area.

FIG. 12 illustrates an example that the display apparatus of FIG. 3 scrolls the second item in the second area. As shown in FIG. 12, when the number of second items 320 is greater than or equal to a predetermined quantity, the display apparatus 1 may display only a predetermined number of second items 320 among the plurality of second items 320 in the second area 32. Even in this case, the display apparatus 1 may display only respective parts of the plurality of second items 320 as overlapped with each other.

A user may make a user input 1151 to scroll left and right a predetermined number of second items 320 displayed in the second area 32, thereby searching the other second items not displayed in the second area 32.

Figure 13:
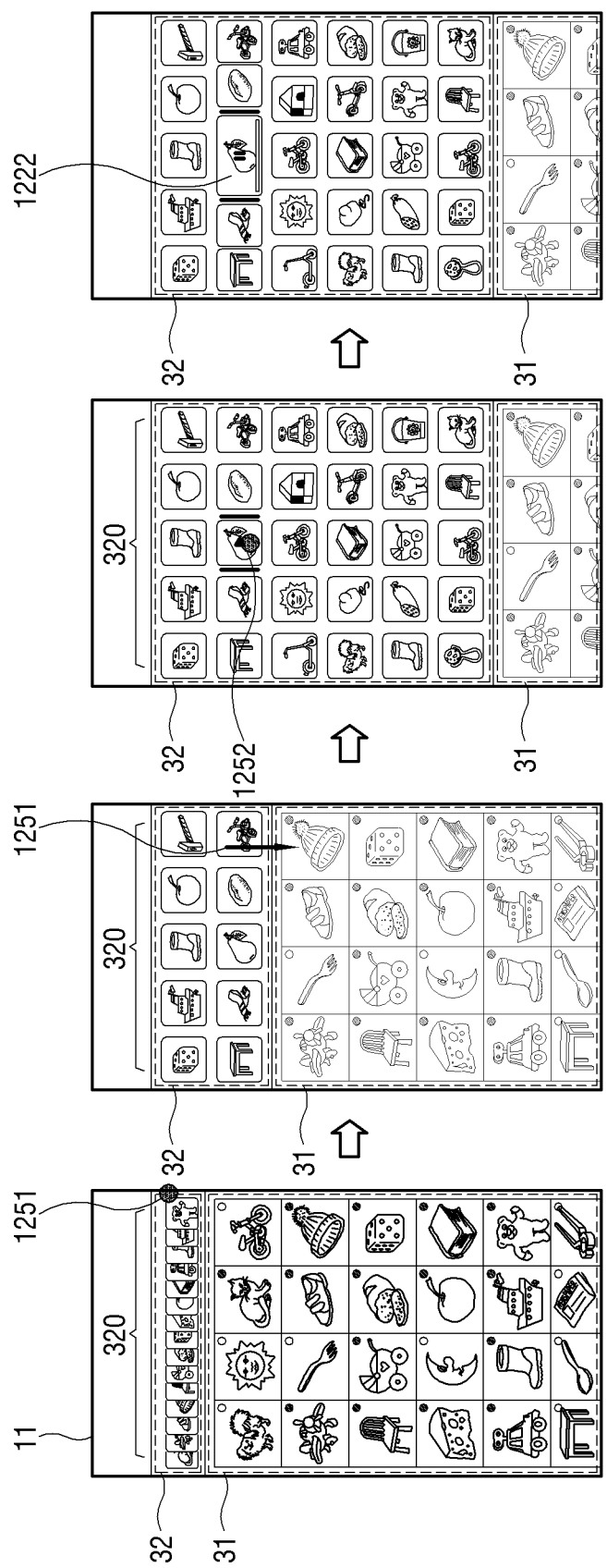
FIG. 13 illustrates an example that the display apparatus of FIG. 3 extends the second area.

FIG. 13 illustrates an example that the display apparatus of FIG. 3 extends the second area. As shown in FIG. 13, when the number of second items 320 is greater than or equal to a predetermined quantity, the display apparatus 1 may display only a predetermined number of second items 320 among the plurality of second items 320 in the second area 32, or may display only respective parts of the plurality of second items 320 as overlapped with each other in the second area 32.

In particular, a user may extend the second area 32 through a user input 1251 made to the second area 32. The user input 1251 may include dragging with regard to the second area 32. When a user makes the user input 1251 to drag the second area 32, the second area 32 may gradually be extended as much as dragged. Referring to FIGS. 11 and 12, when the number of second items 320 is greater than or equal to a predetermined quantity, the display apparatus 1 reduces the size of the plurality of second items 320, displays only a predetermined number of second items 320 among the plurality of second items 320 in the second area 32, or displays only respective parts of the plurality of second items 320 as overlapped with each other.

On the other hand, according to this embodiment, as much as the extension of the second area 32, the plurality of second items may be increased in size, more second items may be displayed, or the plurality of second items 330 and 340 may be fully displayed without being partially overlapped with each other.

Meanwhile, the display apparatus 1 may execute content of the plurality of second items in the extended second area 32. In other words, the display apparatus 1 may execute the content of the second item in response to a user input 1252 with regard to the second item in the extended second area 32. For example, when content 1222 of the second item selected by the user input 1252 is a moving image, an image may be displayed based on the content 1222 in the extended second area 32. As necessary, the display apparatus 1 may reproduce the image based on the content 1222 by considering the resolution, aspect ratio, etc. of the image of the content 1222.

Thus, a user can select the plurality of second items 320 and previously view content of the plurality of selected second items 320 on one screen without depth or without screen change/movement, thereby improving work efficiency.

Figure 14:
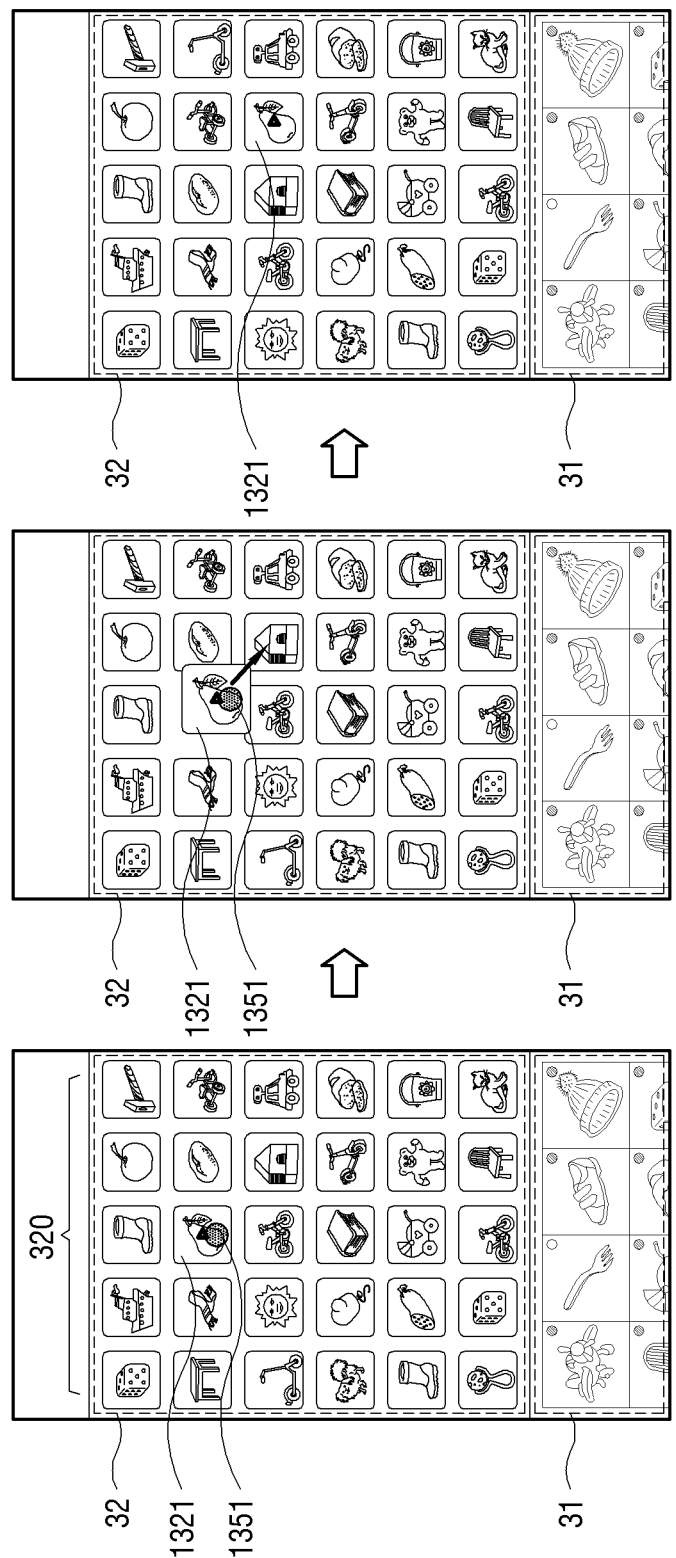
FIG. 14 illustrates an example that the display apparatus of FIG. 13 changes a list order of second items in the extended second area.

FIG. 14 illustrates an example that the display apparatus of FIG. 13 changes a list order of second items in the extended second area. As shown in FIG. 14, the display apparatus 1 may display the plurality of second items 320 in the extended second area 32, change a list order of second item 1321 selected by a user input 1351 among the plurality of second items 320, and display the second item 1321. The user input 1351 may include a touch for more than a predetermined period of time with respect to the second items 1321. When the second item 1321 is dragged and put between other second items, the plurality of second items 320 may be changed in the list order. Thus, it is easy for a user to change the list order of the plurality of second items 320 displayed in the extended second area 32.

Figure 15:
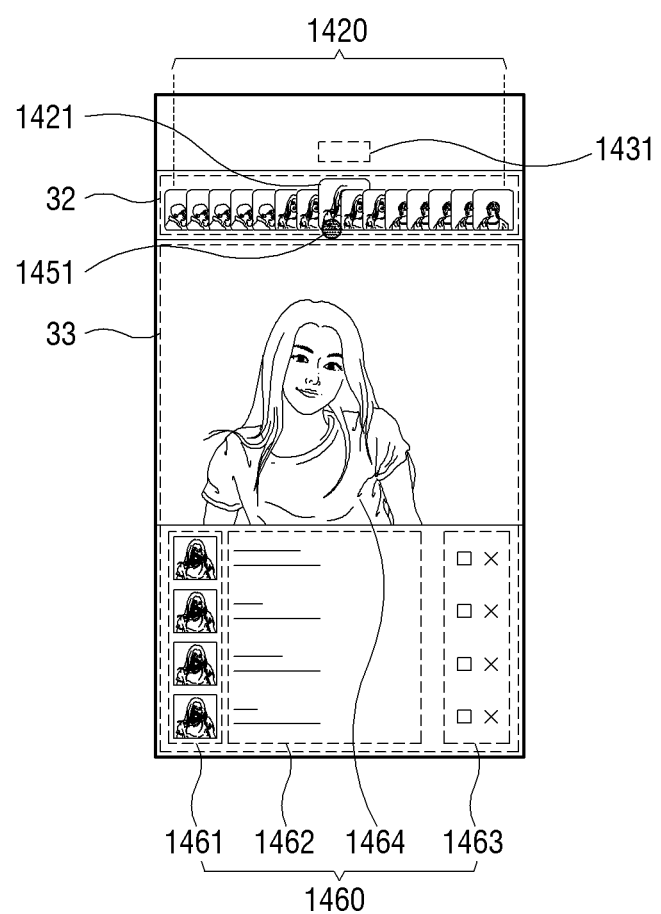
FIG. 15 illustrates an example that additional information about the second item in the second area is displayed.
Figure 16:
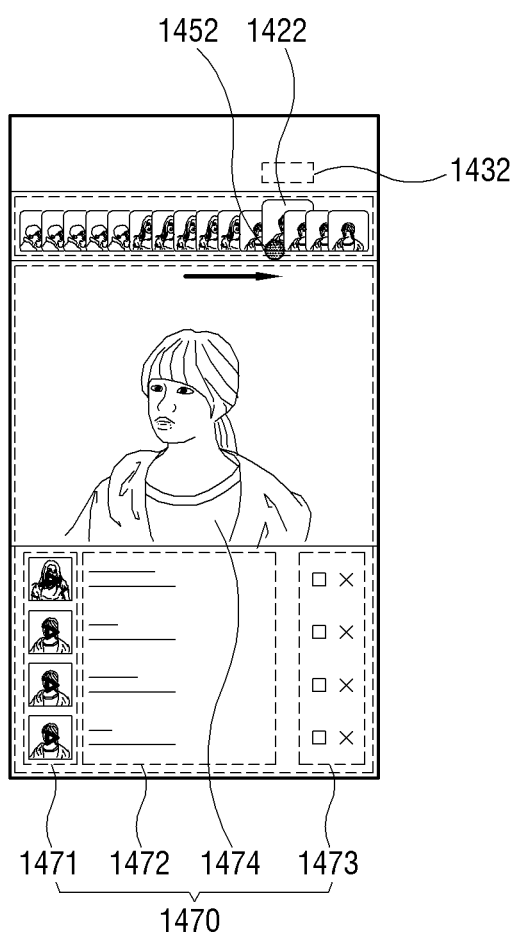
FIG. 16 illustrates another example that additional information about the second item in the second area is displayed.

FIGS. 15 and 16 illustrate examples that additional information about the second item in the second area is displayed. As shown in FIG. 15, the display apparatus 1 may retrieve a second item 1421 selected by a user input 1451 from a plurality of second items 1420 displayed in the second area 32.

In particular, the display apparatus 1 may display additional information 1460 of the second item 1421 selected by the user input 1451 in a third area 33. The third area 33 may be another area on the screen different from the second area 32, and the third area 33 is not limited to that positioned in the first area 31 as shown in FIG. 15. The additional information may include a plurality of third items 1461 corresponding to a plurality of second items 1420, and an explanation 1462 about pieces of content respectively corresponding to the plurality of third items 1461.

The additional information may further include icons 1463 to change the list order of the plurality of third items 1461 or delete the plurality of third items 1461. Because the list order of the plurality of third items 1461 corresponds to a predetermined list order of the plurality of second items 1420, it is possible to change the predetermined list order of the plurality of second items 1420 by changing the list order of the plurality of third items 1461 in response to a user input to the icon 1463. Meanwhile, the additional information 1460 may be related to the content of the second item 1421, and may for example include picture information 1464 about the content of the second item 142 selected by the user input 1451.

Further, the display apparatus 1 may display summary information 1431 of the second item 1421 selected by the user input 1451. Here, the summary information 1431 may be one of the explanations 1462, as information briefer than the explanation 1462 of the additional information. The summary information may be displayed in the upper portion of the selected second item 1421, but not limited thereto.

Further, as shown in FIG. 16, when a user input 1452 is made with respect to a neighboring second item 1422, the second item 1421 becomes inactivated, and the additional information 1460 and the summary information 1431 about the second item 1421 may disappear. Then, the neighboring second item 1422 becomes activated, and thus additional information 1470 and summary information 1432 about the neighboring second item 1422 are further displayed.

Figure 17:
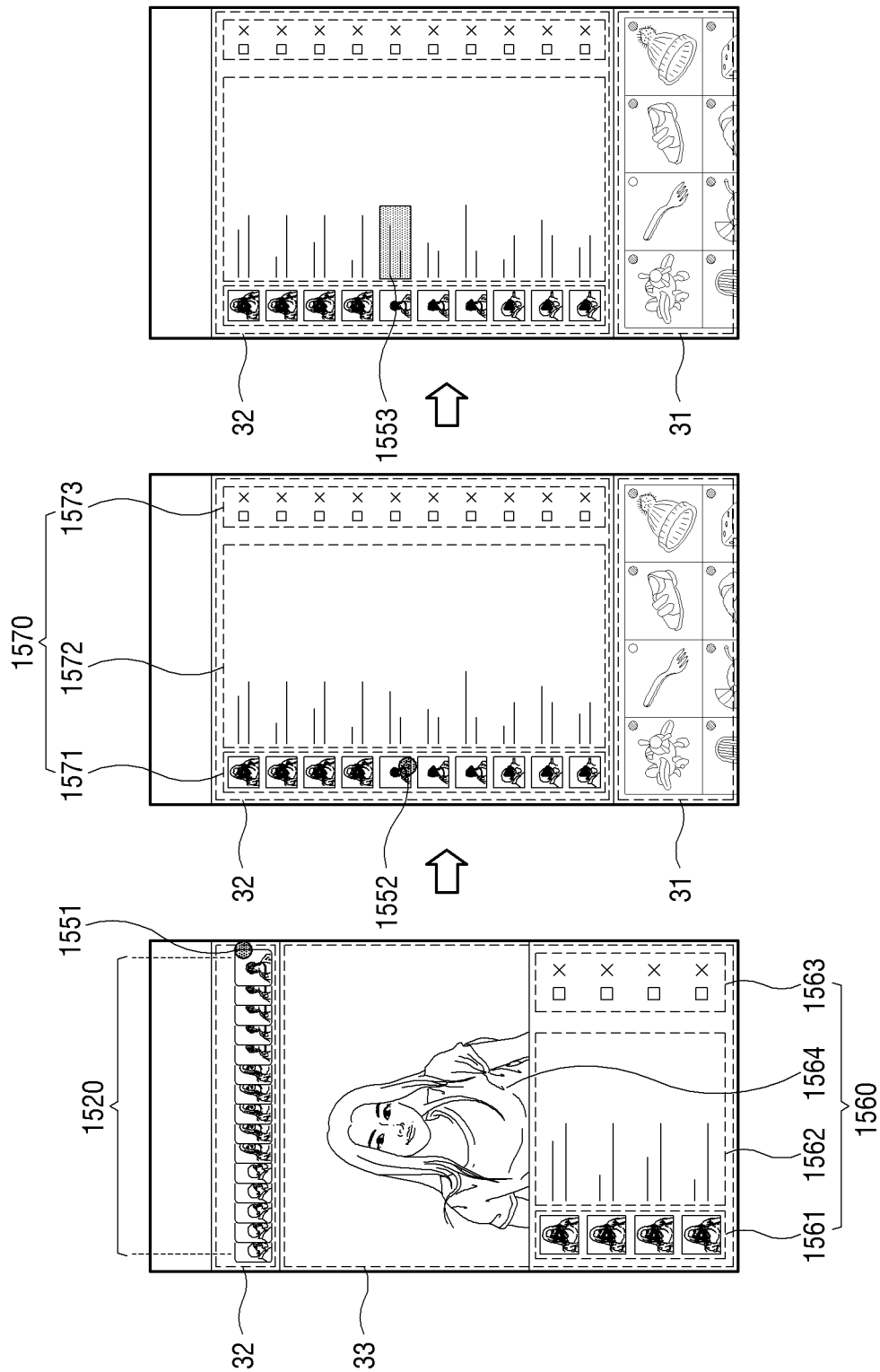
FIG. 17 illustrates an example that the second area is extended.

FIG. 17 illustrates an example that the second area is extended. As shown in FIG. 17, the display apparatus 1 may display a plurality of second items 1520 in the second area 32, and additional information 1560 in the third area 33.

In particular, a user may extend the second area 32 through a user input 1551 made to the second area 32. The user input 551 may include dragging with regard to the second area 32. When a user makes the user input 1551 to drag the second area 32, the second area 32 may gradually be extended as much as dragged in a dragging direction. For example, when the dragging direction is a downward direction of the display apparatus 1, the second area 32 may be extended in the downward direction of the display apparatus 1.

In the extended second area 32, additional information 1570 about the plurality of second items may be displayed. Here, the additional information 1570 may correspond to the additional information 1560 displayed in the third area 33. The additional information 1570 may include a plurality of third items 1571 corresponding to the plurality of second items 1520, an explanation 1572 about each piece of content of the plurality of third items 1571, and an icon 1573 for changing the list order of the plurality of third items 1571 or deleting the plurality of third items 1571. In other words, a predetermined list order of the plurality of second items 1520 may be changed in response to a user input made with regard to the additional information 1570.

Further, the content of the second item may be executed through the additional information 1570. For example, when a user input 1552 made to one among the plurality of third items 1571 is received, the content of the second item corresponding to the third item 1571 may be executed. In this case, an execution state of the content may be displayed together with a progress bar 1553.

Figure 18:
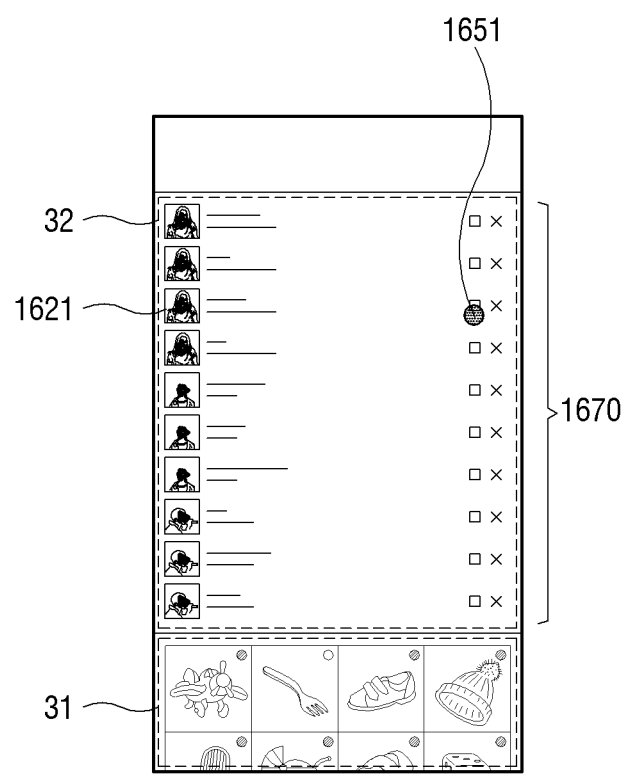
FIG. 18 illustrates an example that a list order of third items is changed.
Figure 19:
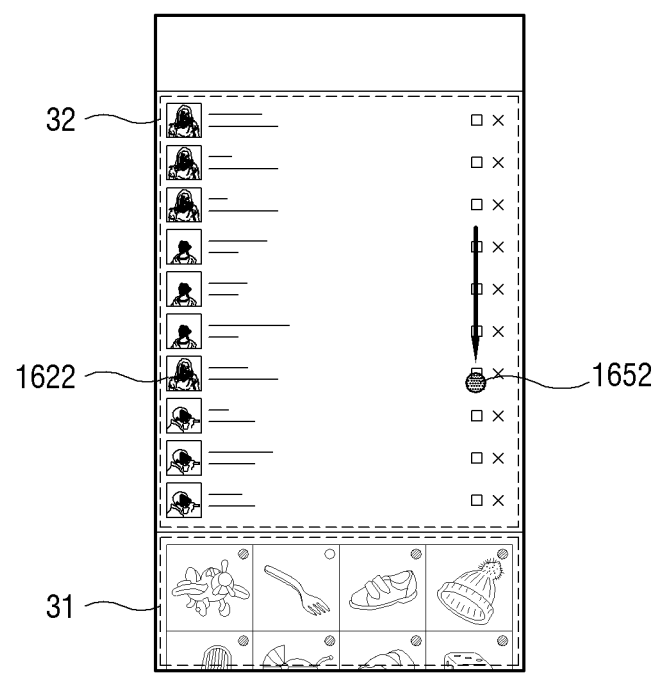
FIG. 19 illustrates another example that a list order of third items is changed.

FIGS. 18 and 19 illustrate examples that a list order of third items is changed. As shown in FIGS. 18 and 19, the display apparatus 1 may display a plurality of third items 1670 in the extended second area 32. In response to a user input 1651 made to select one 1621 among the plurality of third items 1670, a list order of the plurality of displayed third items 1670 may be changed. In this case, the plurality of third items 1670 may also be changed according to the changed list order of the plurality of third items 1670.

Figure 20:
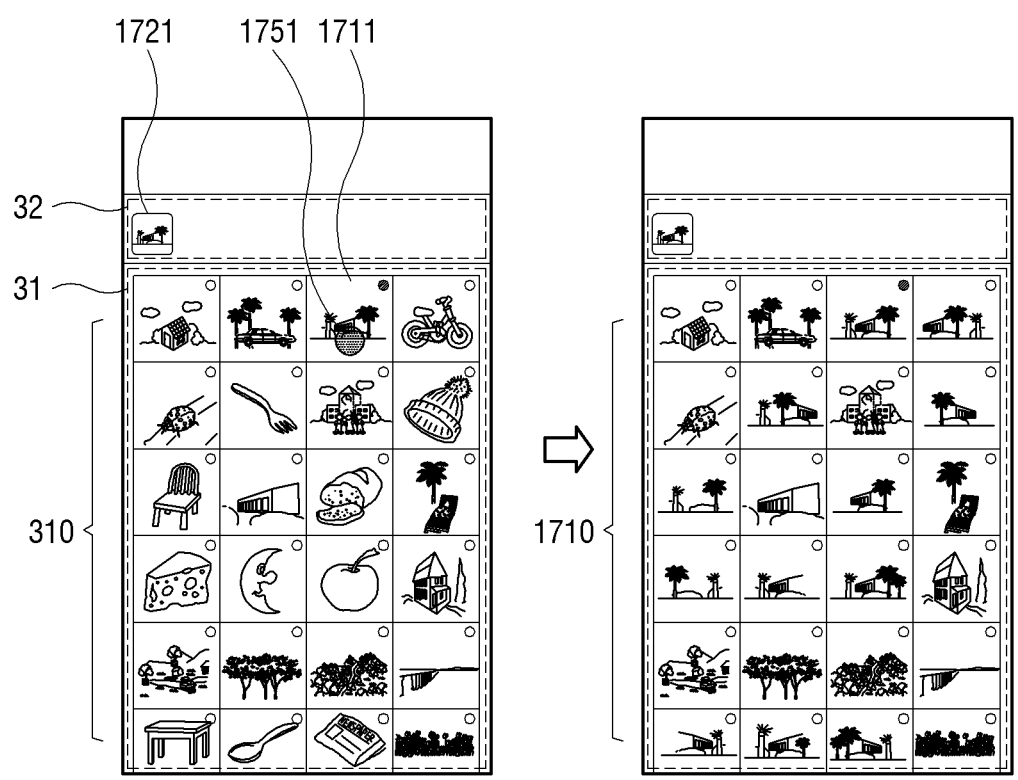
FIG. 20 illustrates an example that the display apparatus of FIG. 3 rearranges the first items in the first area.

FIG. 20 illustrates an example that the display apparatus of FIG. 3 rearranges the first items of the first area. As described above with reference to FIG. 3, the display apparatus 1 may display the plurality of first items 310 in the first area 31, and display a second item 1721, which corresponds to a first item 1711 selected by a first user input 1751 among the plurality of first items 310, in the second area 32.

Here, the display apparatus 1 may recognize content of the first item 1711 selected by the first user input 1751, and preferentially display a plurality of first items 1710, which represent content similar to the content of the first item 1711, in the current first area 31. Here, the recognition of the content may include recognition of a stored date, a received date, a taken date, a data size, a type, a kind, a theme, a category, a selection frequency, a user's preference, a play time, or the like information related to the content.

For example, when the first item 1711 selected by the first user input 1751 is a landscape picture, the display apparatus 1 may preferentially display the first items, which represent the landscape pictures among the plurality of first items 1710, in an upper side of the first area 31. As necessary, the display apparatus 1 may select the first item 1710, which represent the landscape pictures among pieces of content stored in the storage 16 or obtained from the outside, and preferentially display the selected first item 1710 in the current first area 31. Thus, it is easy for a user to select a desired first item among the plurality of first items 1710. Thus, it is easy for a user to search for the second items 921, 922 and 923 activated by the user input 951 among the plurality of second items 320.

Figure 21:
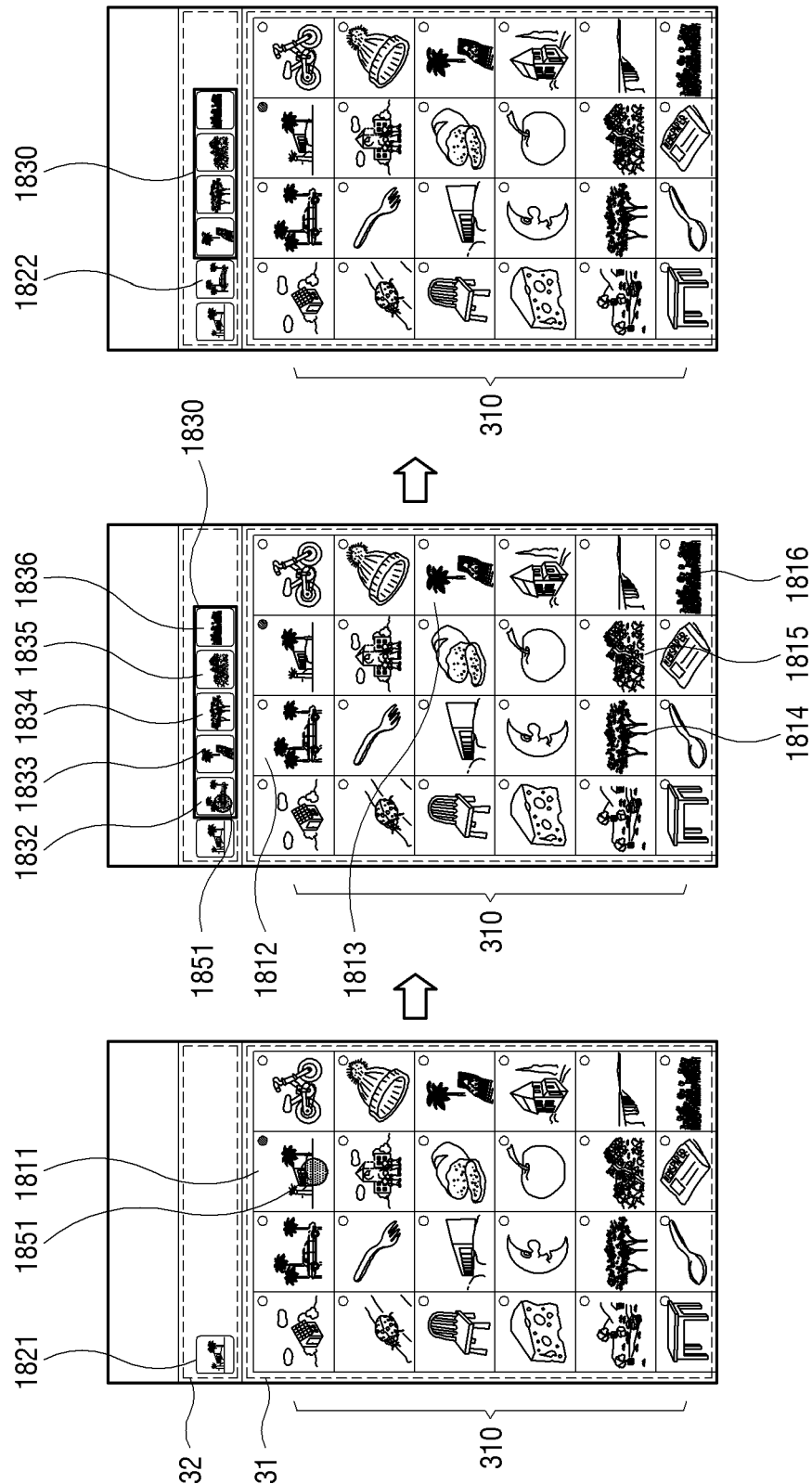
FIG. 21 illustrates an example that the display apparatus of FIG. 3 displays a virtual second item in the second area.

FIG. 21 illustrates an example that the display apparatus of FIG. 3 displays a virtual second item in the second area. As described above with reference to FIG. 3, the display apparatus 1 may display the plurality of first items 310 in the first area 31, and display a second item 1821, which corresponds to a first item 1811 selected by a first user input 1851 among the plurality of first items 310, in the second area 32.

Here, the display apparatus 1 may recognize content of the first item 1811 selected by the first user input 1851, and display a plurality of virtual second items 1830, which represent content similar to the content of the first item 1811 among the plurality of first items 1810, in the second area 32. The virtual second items 1830 refer to items which are displayed in the second area 32 but not regarded as the second items 320 until they are selected by a user. The second items 1830 may be displayed in the first area 31 while neighboring the second item 1821 at upper/lower/left/right sides. Meanwhile, the recognition of the content may include recognition of a stored date, a received date, a taken date, a data size, a type, a kind, a theme, a category, a selection frequency, a user's preference, a play time, or the like information related to the content.

For example, it will be assumed that the first item 1811 selected by the first user input 1851 is a landscape picture, and the second item 1821 corresponding to the first item 1811 is displayed in the second area 32. The display apparatus 1 may display the plurality of virtual second items 1830, which include second items 1832, 1833, 1834, 1835 and 1836 respectively corresponding to first items 1812, 1813, 1814, 1815 and 1816 representing the landscape pictures among the plurality of first items 1810, in the second area 32. The display apparatus 1 may display the plurality of virtual second items 1830 to be different in size, resolution, brightness, etc. from the second item 1821 and thus distinguished from the second item 1821.

When the user input 1851 is made to select one virtual second item 1832 among the plurality of virtual second items 1830, a second item 1822 corresponding to the selected virtual second item 1832 may be displayed in the second area 32. At the same time, the second item 1832 may be removed from the plurality of virtual second items 1830. Thus, it is easy for a user to select the first item 1812, which represents content related to the content of the first item 1811, with reference to the plurality of virtual second item 1830.

Figure 22:
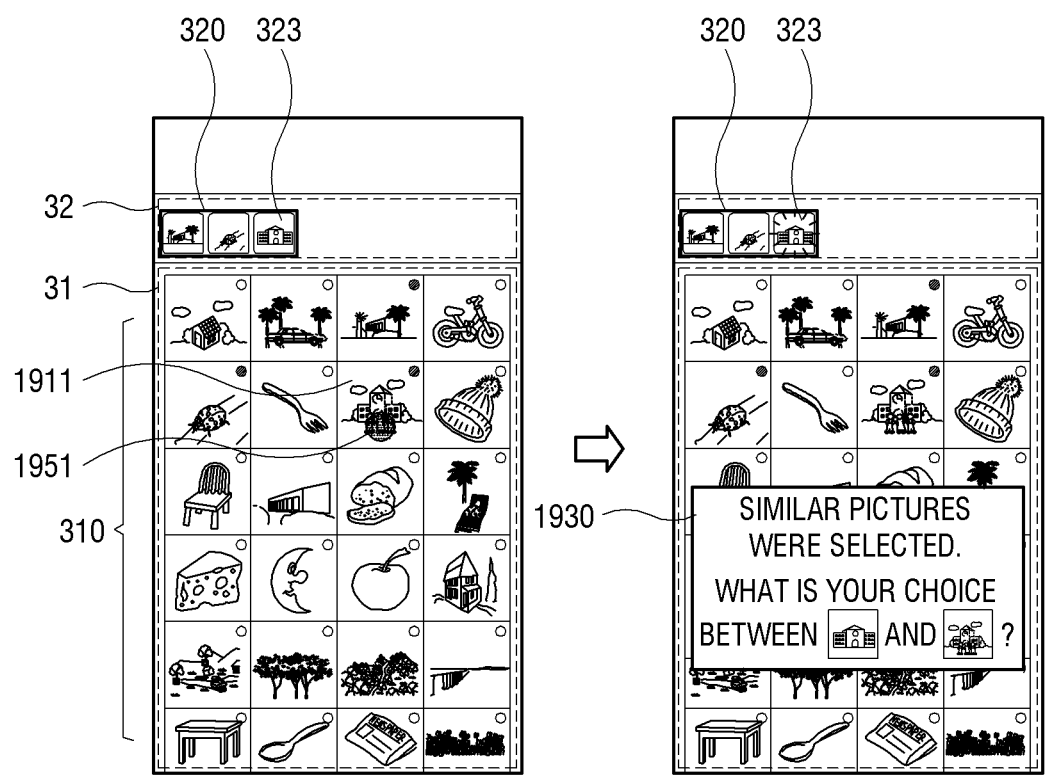
FIG. 22 illustrates an example that the display apparatus of FIG. 3 displays notification of the second item in the second area.

FIG. 22 illustrates an example that the display apparatus of FIG. 3 displays notification of the second item of the second area. As described above with reference to FIG. 3, the display apparatus 1 may display the plurality of first items 310 in the first area 31, and display the plurality of second items 320 in the second area 32.

The display apparatus 1 may distinguishably display a second item 323, which represents content similar to content of a first item 1911 selected by a first user input 1951, among the plurality of second items 320 displayed in the second area 32. This is to inform a user that the second item 323, which represents the same or similar content to the content of the first item 1911 selected by the first user input 1951, has already been selected.

As necessary, the display apparatus 1 may display a UI 1930 to guide selection between the second item 323 that has already been displayed in the second area 32 and the first item 1911 corresponding to the first user input 1951. Thus, a user is prevented from selecting the second item representing the similar content among the plurality of first items 310.

REFERENCE NUMERALS

1: display apparatus
11: display
12: user input unit
13: communicator
14: processor
15: signal processor
16: storage
17: sound output unit

The invention claimed is:

1. A display apparatus comprising:
a display configured to display a screen;
a user input unit configured to receive a user input;
a communicator configured to communicate with an external apparatus; and
a processor configured to display a plurality of first items representing pieces of content in a first area on the screen, list and display a plurality of second items selected based on a first user input among the plurality of displayed first items in a second area on the screen different from the first area, change and display a list order of two or more second items selected based on a second user input among the plurality of second items displayed in the second area, and transmit a request to the external apparatus to perform predetermined functions according to the list order with respect to pieces of content corresponding to the plurality of second items changed in order in the second area.

2. The display apparatus according to claim 1, wherein the processor is configured to add the second item, which is selected based on the first user input among the plurality of first items displayed in the first area, between the plurality of second items displayed in the second area.

3. The display apparatus according to claim 2, wherein the processor is configured to display the second item, which represents content corresponding to content of the second item selected based on the first user input among the plurality of first items displayed in the first area, to be distinguished from other second items among the plurality of second items displayed in the second area.

4. The display apparatus according to claim 1, wherein the processor is configured to move or delete the second item selected based on the second user input among the plurality of second items displayed in the second area.

5. The display apparatus according to claim 1, wherein the processor is configured to display the second item, which is selected based on the second user input among the plurality of second items displayed in the second area, to be distinguished from other second items.

6. The display apparatus according to claim 1, wherein the processor is configured to extend and display the second area based on a third user input to the second area.

7. The display apparatus according to claim 1, wherein the processor is configured to display content of the second item selected based on the second user input among the plurality of second items displayed in the second area.

8. The display apparatus according to claim 1, wherein the processor is configured to display the first item, which represents content corresponding to content of the second item selected based on the first user input among the plurality of first items displayed in the first area, in the first area.

9. A method of controlling a display apparatus comprising a display configured to display a screen, a user input unit configured to receive a user input, and a communicator configured to communicate with an external apparatus, the method comprising:
displaying a plurality of first items representing pieces of content in a first area on the screen;
listing and displaying a plurality of second items selected based on a first user input among the plurality of displayed first items in a second area on the screen different from the first area;
changing and displaying a list order of two or more second items selected based on a second user input among the plurality of second items displayed in the second area; and
transmitting a request to the external apparatus to perform predetermined functions according to the list order with respect to pieces of content corresponding to the plurality of second items changed in order in the second area.

10. The method according to claim 9, wherein the changing and displaying the list order comprises adding the second item, which is selected based on the first user input among the plurality of first items displayed in the first area, between the plurality of second items displayed in the second area.

11. The method according to claim 9, wherein the changing and displaying the list order comprises moving or deleting the second item selected based on the second user input among the plurality of second items displayed in the second area.

12. The method according to claim 9, wherein the changing and displaying the list order comprises displaying the second item, which is selected based on the second user input among the plurality of second items displayed in the second area, to be distinguished from other second items.

13. The method according to claim 9, further comprising extending and displaying the second area based on a third user input to the second area.

14. The method according to claim 9, further comprising displaying content of the second item selected based on the second user input among the plurality of second items displayed in the second area.

15. The method according to claim 9, further comprising displaying the first item, which represents content corresponding to content of the second item selected based on the first user input among the plurality of first items displayed in the first area, in the first area.

* * * * *